United States Patent [19]
Yamamoto

[11] 3,852,992
[45] Dec. 10, 1974

[54] THREAD-FORMING APPARATUS

[75] Inventor: Yoshio Yamamoto, Kyoto, Japan

[73] Assignee: Research Engineering & Manufacturing, Inc., New Bedford, Mass.

[22] Filed: July 16, 1973

[21] Appl. No.: 379,848

Related U.S. Application Data

[62] Division of Ser. No. 126,447, March 22, 1971, Pat. No. 3,772,720.

[30] Foreign Application Priority Data
Apr. 11, 1970 Japan.............................. 45-030970

[52] U.S. Cl........................... 72/469, 10/153, 72/90, 72/470
[51] Int. Cl.............................................. B21d 17/00
[58] Field of Search........... 72/88, 89, 90, 469, 470; 10/10 R, 4, 152, 152 T, 153; 85/46, 47; 151/22

[56] References Cited
UNITED STATES PATENTS
| | | | |
|---|---|---|---|
| 2,161,611 | 6/1939 | Boggild | 85/47 |
| 3,597,781 | 10/1971 | Eibes | 10/152 T |

FOREIGN PATENTS OR APPLICATIONS
| | | | |
|---|---|---|---|
| 466,039 | 5/1937 | Great Britain | 85/47 |

*Primary Examiner*—C. W. Lanham
*Assistant Examiner*—Robert M. Rogers
*Attorney, Agent, or Firm*—Olson, Trexler, Wolters, Bushnell & Fosse

[57] ABSTRACT

A method of making a thread-forming screw of arcuate polygonal cross-section from a blank of circular cross-section comprises rolling the blank between thread-rolling dies having a series of spaced apart grooves that are parallel to the longitudinal axis of the blank. The grooves define obtuse angles large enough to permit the blank to roll into and out of the grooves during the thread-forming. The thread thus formed presents a root cross-section formed by an odd number of intersecting circular arcs and a crest cross-section of a like number of circular arcs and respectively concentric with the root cross-section arcs. The arcs at the crest are joined by smaller thread-swaging arcs or lobes that are of a radius substantially equal to depth of the thread.

10 Claims, 21 Drawing Figures

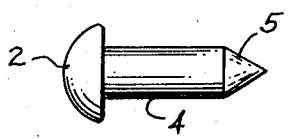
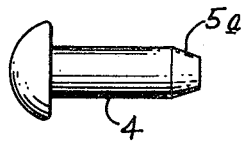
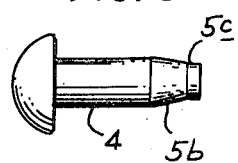
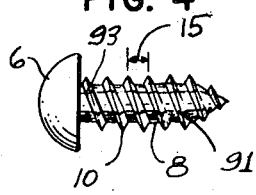
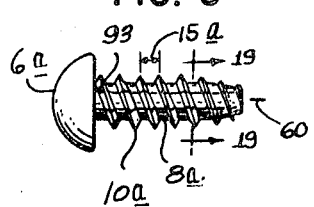
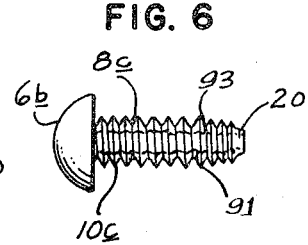
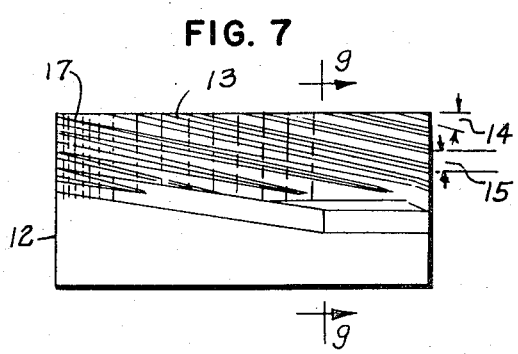
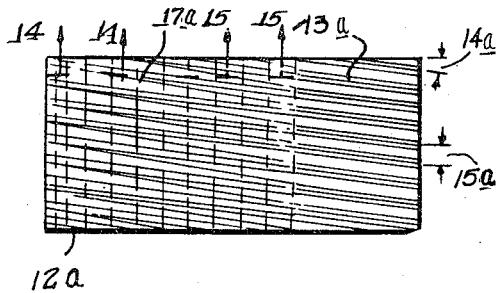
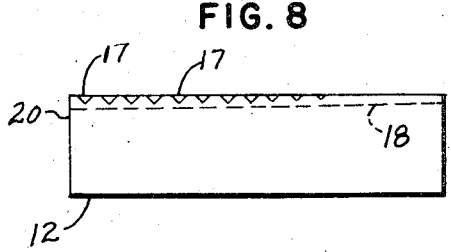
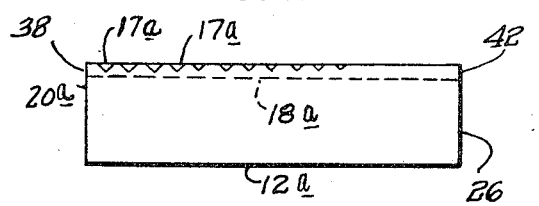
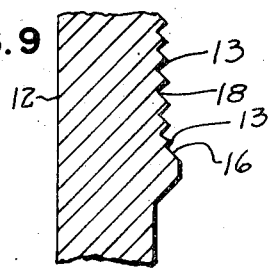

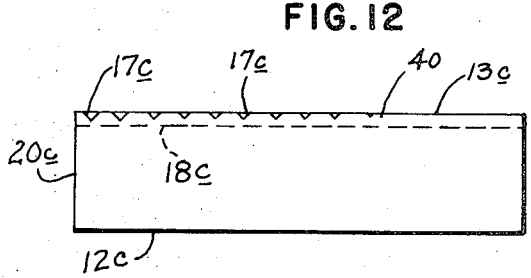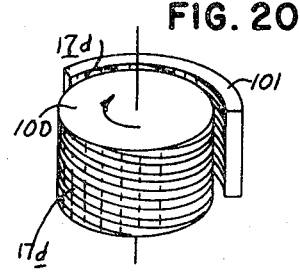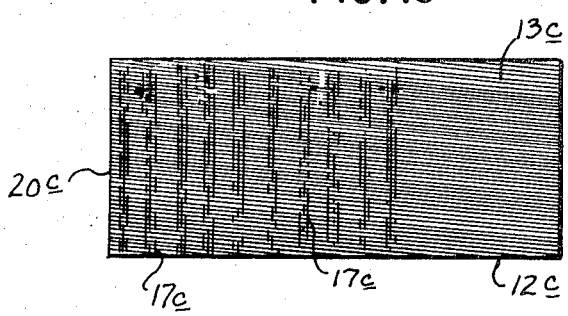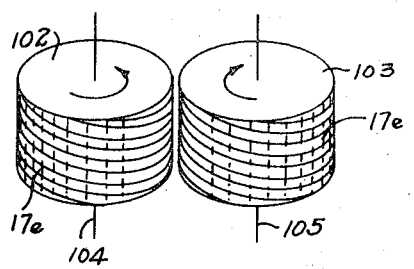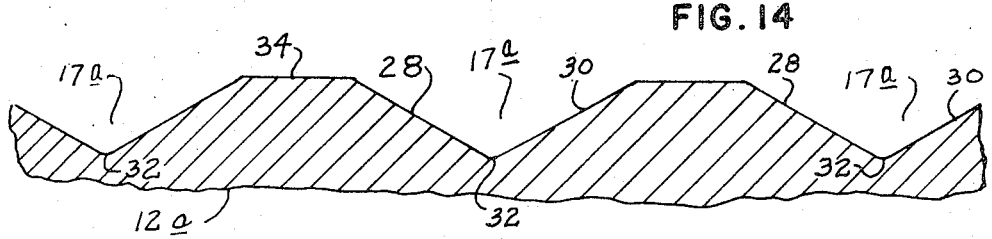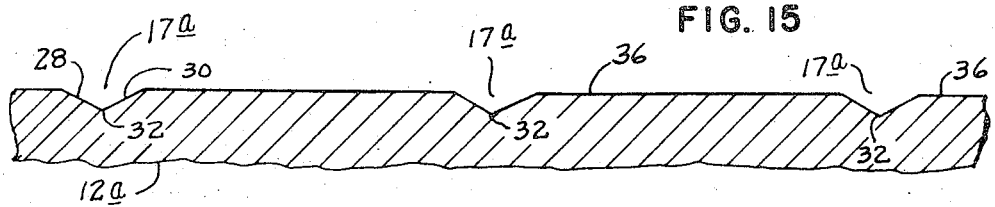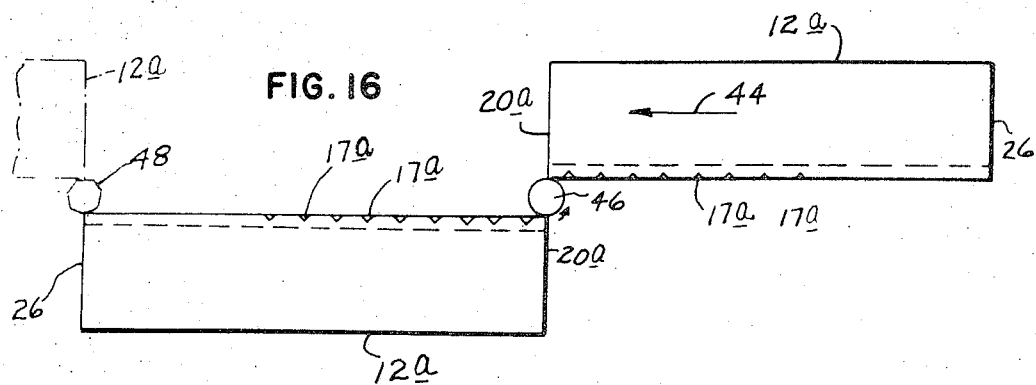

3,852,992

THREAD-FORMING APPARATUS

This is a Division of application Ser. No. 126,447, Filed Mar. 22, 1971, now U.S. Pat. No. 3,772,720.

This invention relates to thread-forming fasteners and like devices and to methods and apparatus for making the same.

The thread-forming or self-tapping fasteners with which the present invention is concerned are of the class that form the thread by a swaging operation. One type of screw of this class is fabricated by a method that includes forming a lobular blank of arcuate polygonal cross-section with an odd number of sides and then rolling a thread onto the blank by rolling between the blank conventional uniformly spaced apart thread-rolling dies. Such screws can be mass produced at low cost. Furthermore, those screws have been found to be highly satisfactory since they require only a relatively low driving torque for forming the thread and yet a relatively high torque is required to strip the screw from the thread formed thereby. Nevertheless, the production of the foregoing screw requires the formation of a blank of arcuate polygonal cross-section which generally necessitates die-reshaping round metal stock.

An object of this invention is to provide a method of making a thread-swaging screw of polygonal cross-section from a blank of circular cross-section.

It is a more specific object of this invention to provide a method of making a screw or like thread-forming member that comprises providing a blank having a longitudinal axis and an exterior surface that is a surface of revolution (e.g., cylindrical or partially cylindrical and partially conical) centered on said longitudinal axis, and rolling on said surface a continuous thread of arcuate polygonal cross-section and having an odd number of thread-swaging lobes. The method further includes the formation of a root cross-section for the thread that is a regular polygon formed of an odd number of intersecting circular arcs, and a crest cross-section for the thread that includes a like number of arcs that are respectively concentric with the arcs of the root cross and are joined by the arcuate thread-swaging lobes.

It is a further object of this invention to provide a method of the type stated in which the blank is rolled in relatively movable die members having spaced apart grooves that are parallel to the aforesaid longitudinal axis and wherein the edges of the grooves provides substantially the centers of rotation during the thread-rolling operation such that the polygonal cross-section is formed.

Another object of this invention is to provide a novel thread-rolling die which may be used in conjunction with a companion die for forming a thread of polygonal cross-section from a blank of circular cross-section.

A still further object of this invention is to provide a die of the type stated that has spaced apart grooves running perpendicular to the direction of travel of the blank. The grooves are V-shaped and are relatively wide to enable the blank to roll in and out of the grooves during the thread-rolling operation. Preferably the grooves define obtuse angles. The grooves, furthermore, vary in depth being deepest at the starting ends of the dies and being progressively shallower to a region about ⅔ of the die length.

A further object of this invention is to provide a thread-forming member, such as a screw, comprising a shank having a thread rolled thereon, the shank having a longitudinal axis that is surrounded by the thread, the thread presenting crest and root cross-sections perpendicular to said axis. The root cross-section is defined by an odd number of intersecting circular arcs and the crest cross-section includes an equal odd number of intersecting circular arcs that are respectively concentric with the arcs at the root cross-section. The center of each circular arc at the root and its associated concentric circular arc at the crest is substantially at the intersection of the two circular arcs at the root that is most remote from the two concentric arcs. The arcs at the crest are joined by smaller circular arcs the radii of which are equal to the height of the thread.

A still further object of this invention is to provide a thread-forming configuration of the type stated which can be embodied into various types of machine screws and other screws by making relatively simple modification of known dies that form threads on a centerless basis.

In the drawings:

FIGS. 1, 2 and 3 show side elevation views of screw blanks of circular cross-section that may be used to fabricate the thread-forming screw of the present invention;

FIGS. 4, 5 and 6 are side elevational views of screws that are formed respectively from the blanks of FIGS. 1, 2 and 3;

FIG. 7 is a top plan view, somewhat schematic in form, of a roll-threading die that may be used in conjunction with a companion die for roll-threading the screw blank of FIG. 1 to produce the screw of FIG. 4;

FIG. 8 is a side elevational view of the roll-threading die of FIG. 7;

FIG. 9 is a fragmentary sectional view taken along line 9—9 of FIG. 7;

FIG. 10 is a top plan view, somewhat schematic in form, of a roll-threading die for use with a companion die to roll-thread the blank of FIG. 2 to form the screw of FIG. 5;

FIG. 11 is a side elevational view of the die of FIG. 10;

FIG. 12 is a side elevational view of a roll-threading die for use with a companion die for forming the screw of FIG. 6 from the blank of FIG. 3;

FIG. 13 is a top plan view, somewhat diagramatic in form, of the die of FIG. 12;

Figure 18:
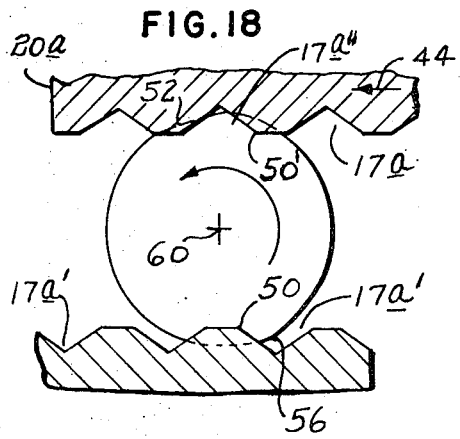
Figure 17:
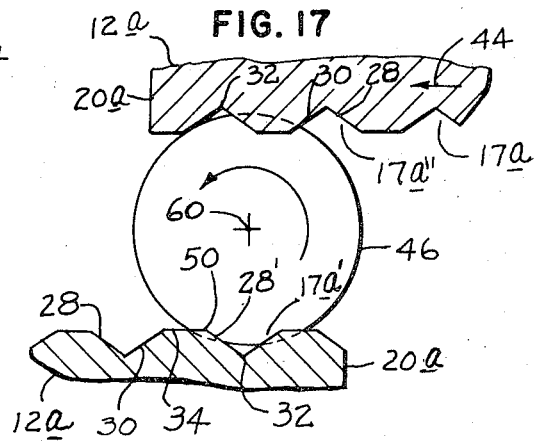
Figure 19:
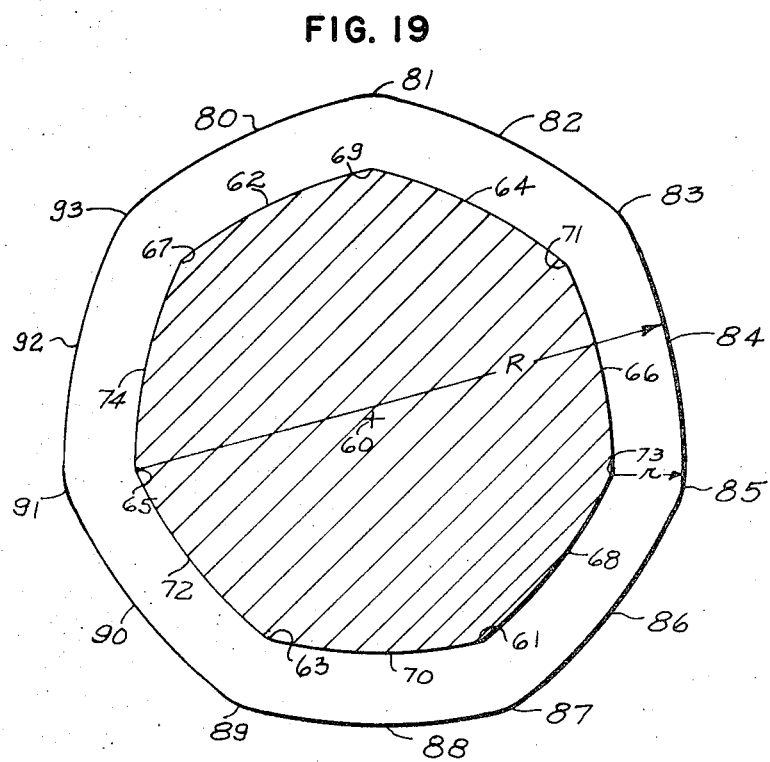

FIGS. 14 and 15 are fragmentary sectional views, on enlarged scales, taken approximately along lines 14—14 and 15—15 of FIG. 10;

FIG. 16 is a side elevational view of cooperating roll-threading dies of FIG. 10 and showing the use thereof to roll-thread a screw;

FIGS. 17 and 18 are fragmentary sectional views, on an enlarged scale, representing early stages of rolling the blank of FIG. 2;

FIG. 19 is a fragmentary cross-sectional view, on an enlarged scale, taken approximately along line 19—19 of FIG. 5;

FIG. 20 is a perspective view, somewhat diagramatic in form, and showing another form of roll-threading dies embodying the present invention; and FIG. 21 is a perspective view, somewhat diagramatic in form, and showing a further pair of roll-threading dies embodying the present invention.

Referring now in more detail to the drawing, FIG. 1 shows a blank of cylindrical cross-section having a head 2 and a shank with a cylindrical portion 4 with a conically tapered end 5 that terminates in a point. When the blank of FIG. 1 is rolled in the usual manner on companion dies of the type shown in FIGS. 7–9, the thread on the screw 6 will have a polygonal cross-section of the type hereinafter more fully described. The thread crest 10 and the thread root 8 will be respectively of uniform dimensions over the cylindrical part of the screw 6, but with the crest and root dimensions progressively becoming smaller at the work-entering end of the screw.

The die plate 12 of FIGS. 7–9 is of generally rectangular configuration and includes thread-forming projections 13 which are inclined to the direction of movement of the die plate 12 by an angle 14 that is equal to the helix angle of the thread to be rolled. Furthermore, as is conventional, the projections 13 are spaced apart by a distance 15 that is equal to the pitch of the thread to be rolled. Also formed on the die plate 12 is an incline or slope 16 that also includes the thread-forming projections and which is used to form the tapering thread portion of the screw at the workentering end thereof. The die plate 12 also has spaced apart parallel notches or grooves 17. The grooves 17 run perpendicular to the normal direction of travel of the die and extend to a depth that is short of the base 18 of the projections, the latter normally forming the crest of the thread that is rolled. The grooves 17 are, furthermore, of progressively decreasing depth from the work-entering end 20 of the die plate 12 and extend from about ½ to about ⅔ of the length of the die plate 12, the ⅔ distance being preferable, as shown in FIG. 8. The purpose and detailed configuration of the grooves 17 will be hereinafter more fully described.

The screw blank of FIG. 2 also has a cylindrical shank portion 4 and frusto-conical end portion 5a. The thread-forming screw 6a of FIG. 5 is similar to the screw 6 except that the crest 10a of the thread tapers toward the work-entering end of the screw while the dimension of the root 8a remains substantially uniform. The die plate 12a for rolling the thread on the screw of FIG. 5 has thread-forming projections 13a inclined at the helix angle 14a and spaced apart by the thread pitch 15a. However, the base portions 18a of the projections 13a are tapered from the work-entering end 20a toward the work-discharge end of the die in the region across which the blank portion 5a passes. The die plate 12a, like the die plate 12, is formed with spaced parallel grooves 17a running transverse to the direction of travel of the die 12a and are for the same purpose as the grooves 17.

While one die plate 12 or 12a, as the case may be, has been shown, it will be apparent that each of those die plates is used with a like die plate of like construction. In the customary thread-rolling operation, the two companion die plates are mounted on a thread-rolling machine with the thread-rolling projections of the dies facing each other. One of the dies may be fixed while the other may be movable, and the blank is rolled therebetween. One advantage of the present invention is that the dies may be mounted on conventional thread-rolling machines in view of the fact that otherwise conventional dies may be readily modified by the provision of the transverse grooves 17, etc.

The screw 6b of FIG. 6 is formed of a blank having a cylindrical portion 4, a frusto-conical portion 5b and a very short cylindrical end portion 5c. The screw 6b may have a thread which is the same in elevation as is found in a variety of machine screws. The screw 6b thus has a crest 10c and a root 8c of uniform dimensions respectively throughout the cylindrical shank portion of the screw. However, the crest tapers at the portion thereof that is rolled out of the blank sections 5b. The root dimension of the thread may be constant throughout the screw or it may taper slightly at the lead end of the section 5b. A short unthreaded work-entering portion 20 may also be optionally formed, if desired.

The die plate 12c shown in FIGS. 12 and 13 is somewhat similar to the die plate 12a except that the projections 13c are shaped to provide the machine screw thread of the thread-forming screw 6b rather than threads of the type shown on the screws 6, 6a. Other types of standard threads may also be formed. As with the previously described die plates, the projections 13c are spaced apart by a distance equal to the pitch of the thread of the screw 6b and the projections 13c are inclined to the direction of movement of the die plate 12c by an angle that corresponds to the helix angle of the thread of the screw 6b. Likewise, the die plate 12c is formed with spaced, parallel, transversely extending grooves 17c. Since the purpose of the grooves 17c is the same as that for the grooves 17, 17a, it will suffice for purposes of the present invention to describe only one set of grooves in detail, for instance the grooves 17a. Likewise, it will suffice to describe the resultant novel thread-forming screw with respect to the screw 6a of FIG. 5, it being understood that similar cross-sectional configurations can be formed on the previously described screws.

Turning now to FIGS. 14 and 15 it will be seen that the grooves 17a of the die plate 12a are of V-shape in cross-section, and are of a depth that is less than the depth of the die thread projections 13a. Thus, the grooves 17a do not extend to the base 18a of the projections 13a. Furthermore, the grooves 17a are deepest (FIG. 14) at the work-entering end 20a of the die plate 12a and progressively become shallower in direct proportion to the distance from the entering end 20a. The sides 28, 30 of each groove 17a define an included obtuse angle of at least about 120°, and the spacing of the valleys 32 of the grooves 17a is substantially uniform throughout the extent of the grooves.

By way of example but not of limitation, a blank like that shown in FIG. 3 may have a diameter at the right circular cylindrical section 4 of about 0.127 inches. The rectangular die plate 12a may have grooves 17a with a depth, namely from crest 34 (FIG. 14) to valley 32, at the work-entering end 20a that may be about 0.012 inches. However, at about two-thirds of the length of the die plate from the end 20a, the grooves may have a distance from crest 36 (FIG. 15) to valley 32 of about 0.003 inches. The spacing of the grooves from one valley 32 to the next valley 32 may be about 0.059 inches, which is approximately one-seventh of the circumference of the blank at the cylindrical section 4. Also, the die plate 12a may have a thread-forming projection depth 38 (FIG. 11) at the work-entering end of about 0.038 inches, a depth of 40 of about 0.020 inches in the region of the terminus of the grooves 17a, and a depth at 42 of about 0.018 inches at the die end 26. The included angle of the grooves sides 28, 30 will be about 120°.

Referring to FIG. 16, two dies 12a are shown, the one bearing the arrow 44 being the movable die and the other being the stationary die. The blank of FIG. 2 is schematically represented by a circle 46 at the starting ends of the dies 12a, 12a. As the movable die moves to the left and to the position shown in broken lines at the left hand end of FIG. 16, the thread is rolled on the blank. The cross-section formed will be of generally heptagonal shape, as diagramatically illustrated at 48, and as more fully illustrated in FIG. 19. The work-entering ends 20a, 20a may, if desired, be beveled or rounded at the thread face to facilitate engagement with the blank.

The thread-rolling action of the dies 12a, 12a may best be understood by reference to FIGS. 17 and 18. FIG. 17 shows the dies and the blank in one position near the starting of the rolling operation and FIG. 18 the blank having been rotated about 1/14 of a turn. As shown in FIG. 17, the blank rests in a groove 17a' of the lower or stationary die 12a. As the upper or movable die moves to the left and parallel to the lower or stationary die, the blank 46 rotates about a center 50 that is at the upper edge of the side 28' of the groove 17a', namely at the junction of the side 28' and the crest 34. Meanwhile, the upper or movable die is biting into the blank to commence roll-forming an arcuate thread portion 52, shown in FIG. 18. The lower or stationary die also rolls a short, arcuate thread portion 56 as a result of rolling about the center 50. These thread portions 52, 56 do not purport to be to scale but are intended merely to be schematic representations of the thread formation on the blank as it moves across the dies. Thereafter, the blank will become nested in the groove 17a''. Upon further movement of the upper or movable die 12a, the blank will begin rotating about a center 50' on the movable die while the stationary die bites into the blank to generate another arc of the thread like the arc 52. At the same time the rotation of the blank on the movable die forms a short arc like the arc 56. Thus, when the blank is rolled between the dies, the blank moves in and out of the notches of both dies and rotates successively about the edges of the grooves 17a of both dies as centers of rotation rather than rotating about the longitudinal axis 60 of the blank as in conventional thread-rolling operations. The axis 60 remains parallel to the notches and thus perpendicular to the direction of movement of the movable die.

FIG. 19 shows in section the thread configuration that is generated by the aforesaid thread-rolling dies. As herein shown, cross-section of FIG. 19 is taken in the full thread portion of the screw 6a, namely that thread portion that is rolled from the blank section 4. The root 8a will be formed by seven intersecting circular arcs 62, 64, 66, 68, 70, 72, 74 of equal length, and the centers 61, 63, 65, 67, 69, 71, 73 of these arcs will, for each arc, be at that intersection of the two arcs that is most remote from the particular arc. Thus, the center of the arc 62 will be at 61, which is the intersection of the arcs 68, 70; the center of the arc 64 will be at 63, which is the intersection of the arcs 70, 72, etc.

The arcs of the crest 10a include seven relatively long circular arcs 80, 82, 84, 86, 88, 90, 92 of equal length. These long arcs 80, 82, 84, etc. are concentric respectively with the root arcs 62, 64, 66, etc. Thus, the long crest arcs each have a radius R, shown in FIG. 19. In addition, the crest includes seven relatively short arcs 81, 83, 85, 87, 89, 91, 93 of equal length that form the thread-swaging lobes of the thread and which successively join the long arcs 80, 82, 84, etc. These short arcs each have a radius r, which is the depth of the thread. Thus, the arc 85 has a center at the intersection 73, the arc 87 has a center at the intersection 61, etc. In the method heretofore described, the crest arcs 80, 82, etc., and the concentric root arcs 62, 64, etc. are rolled by the die opposite to the die upon which the blank is rotating as a center. However, the short or lobe forming arcs 81, 83, etc., are rolled by the die upon which the blank is rolling as a center.

In the example of the invention described, the magnitude of the thread-swaging lobes is about 0.002 inches measured radially from an inscribed circle centered on the axis 60 and tangent to the long arcs 80, 82, etc. Furthermore, if it is assumed that the blank is rolled with a full thread at a point where the 120° notches 17a are about 0.009 inches deep, then the length of each side 28, 30 will be 0.018 inches and this distance will constitute the thread depth and the radius r. This corresponds to the finish thread depth at the die end 26, which as previously indicated for the example described is 0.018 inches.

While the invention has been described with respect to parallel movable rectangular die plates 12a, 12a, the transverse grooves such as 17, 17a, etc., may be provided on other known roll-threading dies. Thus, in FIG. 20 there is shown a cylindrical rotating die 100 and a fixed arcuate die 101, each incorporating grooves 17d parallel to the center of rotation of the die 101 for generating on a centerless basis the thread configuration of FIG. 19. Similarly, FIG. 21 shows two cylindrical dies 102, 103 rotatable about parallel axes 104, 105. Each die may have parallel grooves 17e positioned disposed over about ⅔ of the arcuate extents thereof.

It will also be apparent that while the thread cross-section (e.g., at the root) is a heptagon, the present invention contemplates grooving the dies to form thread cross-sections of a greater or lesser odd number of circular arcs.

The invention is claimed as follows:

1. A die for use in cooperating with a companion die for rolling a thread on a screw of arcuate polygonal cross section from a blank of circular cross section, wherein said arcuate polygonal cross section has an odd number of thread-swaging lobes that any circumferentially separated by arcuate sides having longer radii of curvature than that of said lobes, said die having thread-forming projections conjugate to the profile of the thread to be rolled on a blank, said projections being inclined to the direction of travel of the die as it engages the blank by an angle equal to the helix angle of the thread to be rolled, and means on said die cooperable with companion means on said companion die for reshaping said blank of circular cross-section to a screw with said arcuate polygonal cross-section during the rolling operation, said means on said die comprising spaced apart grooves running transversely of said projections and perpendicular to said direction of travel.

2. A die according to claim 1 in which the sides of the grooves define obtuse angles.

3. A die according to claim 2 in which the grooves are disposed over about ½ to ⅔ of the lengths of the die beginning with the entrance end of the die.

4. A die according to claim 1 in which the grooves are of progressively shallower depth from the working entrance portion of the die toward a portion of the die remote from said entrance portion.

5. A die according to claim 1 in which the obtuse angle is at least of the order of 120°.

6. A die according to claim 4 in which the sides of the grooves converge to form groove valleys, and said valleys are equally spaced apart.

7. A die for use in cooperating with a companion die for rolling a screw thread on a blank, said die having thread-forming projections conjugate to the profile of the thread to be rolled on a blank, said projections being inclined to the direction of travel of the die as it engages the blank by an angle equal to the helix angle of the thread to be rolled, and said die having spaced apart grooves running transversely of said projections and perpendicular to said direction of travel, said grooves being of progressively shallower depth from the working entrance portion of the die toward a portion of the die remote from said entrance portion, and wherein the grooves are of depths that are less than the depths of said thread-forming projections.

8. A die pair for rolling a thread-forming screw of arcuate polygonal cross-section from a blank of circular cross section, wherein said arcuate polygonal cross-section has an odd number of arcuate thread-swaging lobes that are circumferentially separated by arcuate sides that have longer radii of curvature than that of said lobes, each die of the pair having thread-forming projections, at least one of said dies being movable relative to the other die such that said projections cooperate to roll the thread on said blank, and means on said dies operable during the rolling operation to reshape said blank from its circular cross-section to said lobular cross-section, said means comprising spaced apart grooves on said dies that form centers of rotation for the blank first on one die and then on the other die as the blank is rolled therebetween.

9. A die pair according to claim 8 in which the dies have work entrance portions and the grooves are of progressively shallower depth in a direction away from said work entrance portions.

10. A die pair according to claim 8 in which said circular cross section is in a cylindrical section of the blank and the distance between the centers of grooves in each die is a fractional part of the circumference in said cylindrical section, the ratio of said fractional part to the said circumference being equal to the number of lobes.

* * * * *